United States Patent
Yoshimura

[11] Patent Number: 6,097,146
[45] Date of Patent: Aug. 1, 2000

[54] PHOSPHOR FOR PLASMA DISPLAY PANEL

[75] Inventor: Futoshi Yoshimura, Shizuoka-Ken, Japan

[73] Assignee: Kabushiki Kaisha Toshiba, Kawasaki, Japan

[21] Appl. No.: 09/006,355

[22] Filed: Jan. 13, 1998

[30] Foreign Application Priority Data

Jan. 14, 1997 [JP] Japan .................................. 9-004628

[51] Int. Cl.$^7$ ............................... H01J 1/63; H01J 61/44
[52] U.S. Cl. .......................................................... 313/486
[58] Field of Search .................................. 313/467, 468, 313/485, 486, 584, 586, 585; 252/301.4 R; 430/7

[56] References Cited

U.S. PATENT DOCUMENTS

| | | | |
|---|---|---|---|
| 4,085,351 | 4/1978 | Takahashi et al. | 313/486 |
| 5,009,972 | 4/1991 | Higuchi et al. | 430/7 |
| 5,086,297 | 2/1992 | Miyake et al. | 313/485 |
| 5,136,207 | 8/1992 | Miyake et al. | 313/486 |
| 5,394,055 | 2/1995 | Tono et al. | 313/467 |
| 5,585,692 | 12/1996 | Sugimoto et al. | 313/486 |

FOREIGN PATENT DOCUMENTS 52-54690  5/1977  Japan ................. H01J 1/63

*Primary Examiner*—Michael H. Day
*Attorney, Agent, or Firm*—Oblon, Spivak, McClelland, Maier & Neustadt, P.C.

[57] ABSTRACT

The present invention provides a phosphor capable of improving color purity and the light emitting efficiency of a plasma display panel (PDP), and provides the plasma display panel (PDP) using this phosphor. The phosphor of the present invention is characterized in that this phosphor is represented by a general formula $(Y_{1-a-b}Gd_aEu_b)_2O_3$ wherein a and b satisfy $0<a\leq0.90$, $0.01\leq b\leq0.20$. The plasma display panel of the present invention is characterized in that the plasma display panel comprises a light emitting layer 5 including the above phosphor 4.

5 Claims, 2 Drawing Sheets

PHOSPHOR FOR PLASMA DISPLAY PANEL

BACKGROUND OF THE INVENTION

1. Field of the Invention

The present invention relates to a phosphor for a plasma display panel, and particularly relates to a phosphor for a plasma display panel enabling to improve color purity and greatly increase light emitting efficiency when this phosphor is used as material for constituting a light emitting layer of the plasma display panel, and also relates to the plasma display panel using this phosphor.

2. Prior Art

Recently, the merchandising stage of a plasma display panel (PDP) as a television receiver instead of a conventional large-sized heavy cathode ray tube (CRT) has been attained and this plasma display panel is widely spreading. The plasma display panel is easily made thin and light in weight from its structural features in comparison with the conventional cathode ray tube. Accordingly, the plasma display panel is highlighted as a receiver for realizing a wall type television requiring a large screen and a thinner thickness.

FIG. 2 is a cross-sectional view schematically showing the structure of the plasma display panel. In the structure of the plasma display panel 1, a front side substrate 2 and a rear side substrate 3 having a light transmitting property such as glass, etc. are oppositely arranged such that a predetermined discharging space 10 is formed. A light emitting layer 5 including particles of a phosphor 4 is formed on an inner surface of the above front side substrate 2. Many anodes 6 and many cathodes 7 each having a stripe shape are arranged on an inner surface of the above rear side substrate 3. Each group of the electrodes 6, 7 is covered with a dielectric layer 8. A surface of this dielectric layer 8 is further covered with a protecting layer 9. The discharging space 10 is set to have about 0.1 mm in height. A mixing gas 11 constructed by helium (He) gas or neon (Ne) gas and several vol. % of xenon (Xe) gas is sealed in the above discharging space 10 to generate an ultraviolet ray for exciting the phosphor 4 in discharging.

In the plasma display panel 1 of the above construction, the phosphor 4 is excited by a vacuum ultraviolet ray (VUV) having 147 nm in wavelength and discharged in resonance with xenon of the mixing gas 11 in the discharging space 10 of the electrodes 6, 7. As a result, visible light is radiated so that a predetermined image is displayed.

A maximum subject of the above plasma display panel (PDP) is conventionally the improvement of an image quality. A vigorous improvement of the plasma display panel is advanced to make consistent luminance showing the brightness of a screen and a contrast ratio as a brightness ratio of white and black. However, no image quality corresponding to that of the cathode ray tube (CRT), etc. is yet obtained at the present time and there is large room for further improving the structure of the plasma display panel and a using material thereof.

A phosphor for a general fluorescent lamp and its improved goods are used as a light emitting material for the plasma display panel (PDP) at present. In a basic principle of the phosphor for the fluorescent lamp, an ultraviolet ray having 254 nm in wavelength is converted to visible light. In contrast to this, in a basic principle of the plasma display panel, an ultraviolet ray having 147 nm in wavelength is converted to visible light. Accordingly, the phosphor for the fluorescent lamp does not necessarily have excellent characteristics as a phosphor for the plasma display panel from such a difference between exciting sources. However, there is no use of the phosphor for converting the ultraviolet ray having 147 nm in wavelength to the visible light except for the plasma display panel. Therefore, at present, it is behind in the development of a new phosphor for the plasma display panel having excellent characteristics.

Conventionally, a phosphor additionally activated by europium of three valences as represented by a general formula $Y_2O_3$:Eu is widely used as a red light emitting phosphor for the plasma display panel (PDP). This phosphor is a rare earth oxide phosphor having a light emitting peak wavelength of 611 nm.

However, when the red light emitting phosphor represented by the above general formula $Y_2O_3$:Eu is excited by an ultraviolet ray having a wavelength of 147 nm, problems exist in that light emitting intensity in a red light region is low and color purity required as a display becomes insufficient. Therefore, when the plasma display panel is formed by including this phosphor within a fluorescent film, a problem exists in that it is extremely difficult to improve light emitting efficiency and color purity of the plasma display panel. Accordingly, it is a technical subject to develop a phosphor having a high light emitting intensity and a high color purity in the red light region.

SUMMARY OF THE INVENTION

To solve the above problems, an object of the present invention is to provide a phosphor capable of particularly improving color purity and the light emitting efficiency of a plasma display panel (PDP), and provide the plasma display panel (PDP) using this phosphor.

To achieve the above object, the inventors of this patent application have manufactured a phosphor having various kinds of compositions by adding various kinds of element components to a phosphor including $Y_2O_3$:Eu. Further, the inventors of this patent application have manufactured a plasma display panel having a light emitting layer formed by using these phosphor composition substances. The influences of kinds and adding amounts of the added elements on each phosphor and the light emitting efficiency and the color purity of the plasma display panel are compared and examined by experiments.

As a result, the following findings have been found. Namely, a phosphor having a high light emitting efficiency and a preferable color purity is obtained under the excitation of an ultraviolet ray of 147 nm when gadolinium (Gd) is solid-dissolved into the $Y_2O_3$:Eu-including phosphor. When this phosphor is included in the light emitting layer of the plasma display panel, it is found that the plasma display panel has excellent light emitting efficiency and color purity for the first time. The present invention is completed on the basis of the above knowledge.

Namely, a phosphor in the present invention is characterized in that the phosphor is represented by a general formula $(Y_{1-a-b}Gd_aEu_b)_2O_3$ wherein a and b satisfy $0<a\leq 0.90$, $0.01\leq b\leq 0.20$. The value of a is preferably set to a range of $0.4\leq a\leq 0.6$.

A plasma display panel in the present invention is characterized in that the plasma display panel comprises a light emitting layer including a phosphor represented by a general formula $(Y_{1-a-b}Gd_aEu_b)_2O_3$ wherein a and b satisfy $0<a\leq 0.90$, $0.01\leq b\leq 0.20$.

The ranges of the values a and b in the general formula are limited for the following reasons.

Gadolinium (Gd) constituting an oxide has effects for increasing light emitting energy in a red light region by solid-dissolving this gadolinium into the phosphor. In the present invention, this gadolinium is included in the phosphor such that a weight ratio a of the oxide $(Gd_2O_3)$ is equal to or smaller than 0.90. When the weight ratio exceeds 0.90, the light emitting intensity becomes insufficient. The weight ratio a is preferably equal to or greater than 0.05 and is smaller than 0.90. Further, the weight ratio a is more preferably equal to or greater than 0.4 and is more preferably equal to or smaller than 0.6.

In contrast to this, europium acts as an additional active agent for increasing the light emitting efficiency of the phosphor and is added in a weight ratio b from 0.01 to 0.20 with respect to yttrium (Y). When an adding ratio is smaller than 0.01 in the weight ratio b, the light emitting efficiency is insufficient. In contrast to this, when this adding ratio exceeds 0.20, the light emitting efficiency is reversely reduced by density quenching of europium.

A manufacturing method (synthetic method) for making the phosphor of the present invention is not particularly limited. For example, the phosphor is manufactured by compounding the following various kinds of phosphor raw materials such that these raw materials have predetermined component compositions. Namely, predetermined amounts of compounds for easily generating $Y_2O_3$, $Gd_2O_3$ and $Eu_2O_3$ by thermal processing are measured by a balance. For example, the compound for easily generating $Y_2O_3$ by the thermal processing is constructed by an yttrium oxide $(Y_2O_3)$ or an yttrium oxide, an yttrium carbonate, an yttrium nitrate, etc. For example, the compound for easily generating $Gd_2O_3$ by the thermal processing is constructed by a gadolinium oxide $(Gd_2O_3)$ or a gadolinium oxide, a gadolinium carbonate, a gadolinium nitrate, etc. For example, the compound for easily generating $Eu_2O_3$ by the thermal processing is constructed by an europium oxide $(Eu_2O_3)$ or an europium oxide, an europium carbonate, an europium nitrate, etc.

These compounds are dissolved into an acid such as a hydrochloric acid, a nitric acid, etc. and an oxalic acid is added to the dissolved compounds and is deposited as an oxalate. This coprecipitation oxalate is decomposed for several hours at 1000° C. so that an oxide is obtained. Further, a suitable amount of flux is added to this oxide and is burned for 4 to 5 hours at 1300 to 1500° C. The obtained burned material is next ground and is washed and dried whereby a phosphor of the present invention can be obtained.

In accordance with the phosphor having the above construction, gadolinium (Gd) is solid-dissolved into the $Y_2O_3$:Eu-including phosphor. Therefore, the light emitting intensity and the color purity in a red light emitting region can be greatly increased. Accordingly, when the plasma display panel is formed by including this phosphor in a light emitting layer, the light emitting efficiency and the color purity of the plasma display panel can be greatly improved.

DESCRIPTION OF THE PREFERRED EMBODIMENTS

Next, the embodiment mode of the present invention will be explained more concretely with reference to the following Examples.

EXAMPLE 1

53 wt % of $Y_2O_3$ powder, 40 wt % of $Gd_2O_3$ powder and 7 wt % of $Eu_2O_3$ powder are measured as a phosphor raw material by a balance and are dissolved into a suitable amount of nitric acid and are formed as a solution at 70° C. A predetermined amount of oxalic acid $(H_2C_2O_4 \cdot 2H_2O)$ is injected into this solution and is deposited as an oxalate. The obtained coprecipitation oxalate is thermally decomposed for three hours at 1000° C. so that an oxide is obtained. This oxide is burned for 4 hours at 1400° C. Further, the obtained burned material is ground by a ball mill and is washed and cleaned. Thus, a phosphor represented by a composition formula $(Y_{0.53}Gd_{0.40}Eu_{0.07})_2O_3$ is obtained.

Comparative Example

In the Example 1, processing similar to the Example 1 is performed except that no $Gd_2O_3$ is added. Thus, a phosphor represented by a composition formula $(Y_{0.93}Eu_{0.07})_2O_3$ in a Comparative Example is obtained.

Figure 1:
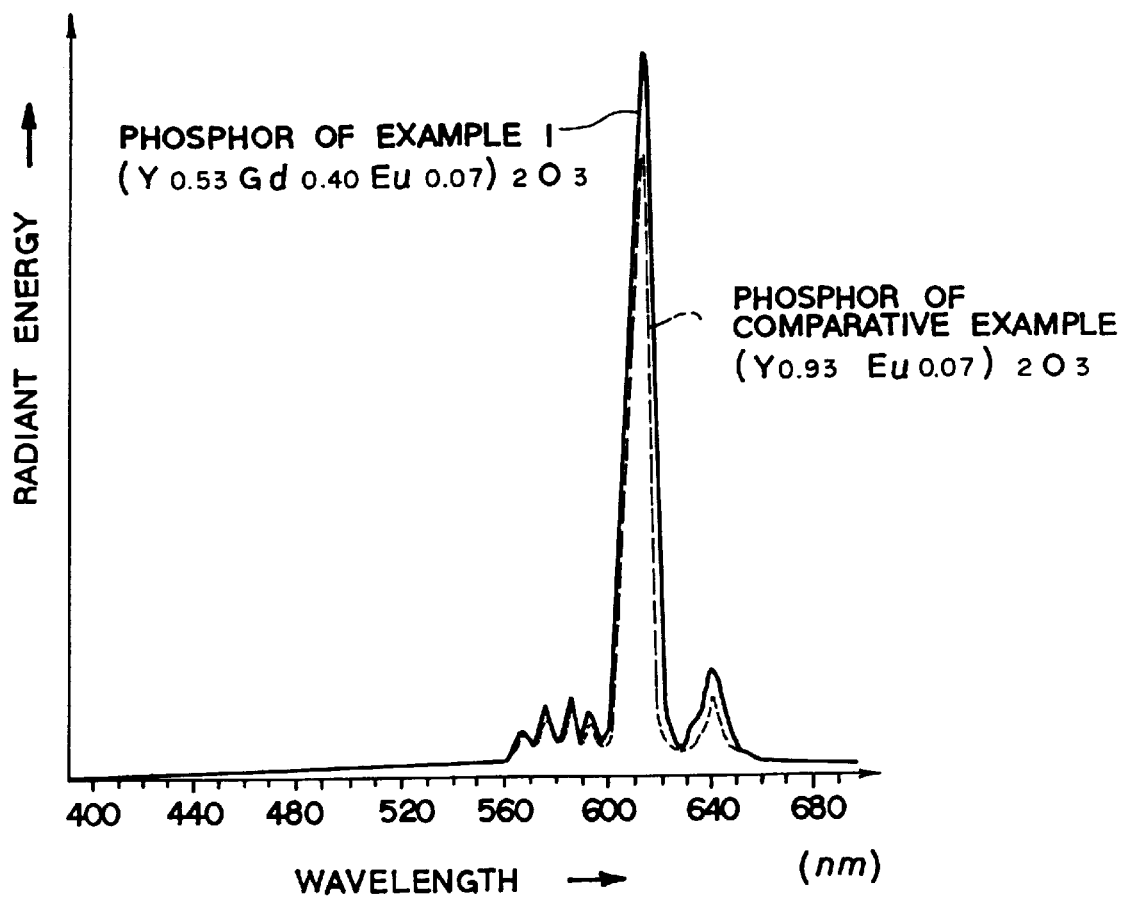
FIG. 1 is a graph showing a light emitting exciting spectral distribution of a phosphor in accordance with an Example 1 of the present invention together with a light emitting exciting spectral distribution of Comparative Example.

FIG. 1 is a graph showing light emitting exciting spectral distributions of the phosphors of the Example 1 and the Comparative Example. It is clear that radiant energy of the phosphor of the Example 1 including gadolinium (Gd) is increased in comparison with the phosphor in the Comparative Example in which no gadolinium (Gd) is included.

To evaluate characteristics of this phosphor, an ultraviolet ray having 147 nm in wavelength is irradiated to this phosphor so as to excite this phosphor. Light emitting luminance L1 and chromaticity are measured with respect to an obtained light emitting spectrum.

The light emitting luminance L1 of the phosphor is relatively shown with the light emitting luminance of the conventional phosphor (in the Comparative Example) including no $Gd_2O_3$ as a reference value 100.

The light emitting chromaticity (x,y) of the phosphor is measured with respect to zero hour and 1000 hours after the light emission. A changing value Δx of the light emitting chromaticity is a value obtained by subtracting chromaticity x1000 after the light emission for 1000 hours from chromaticity x0 at an initial light emitting time. Δy is also a value similarly calculated with respect to chromaticity y. The light emitting chromaticity is also relatively shown with the chromaticity of the conventional phosphor (in the Comparative Example) as a reference value (0,0).

Figure 2:
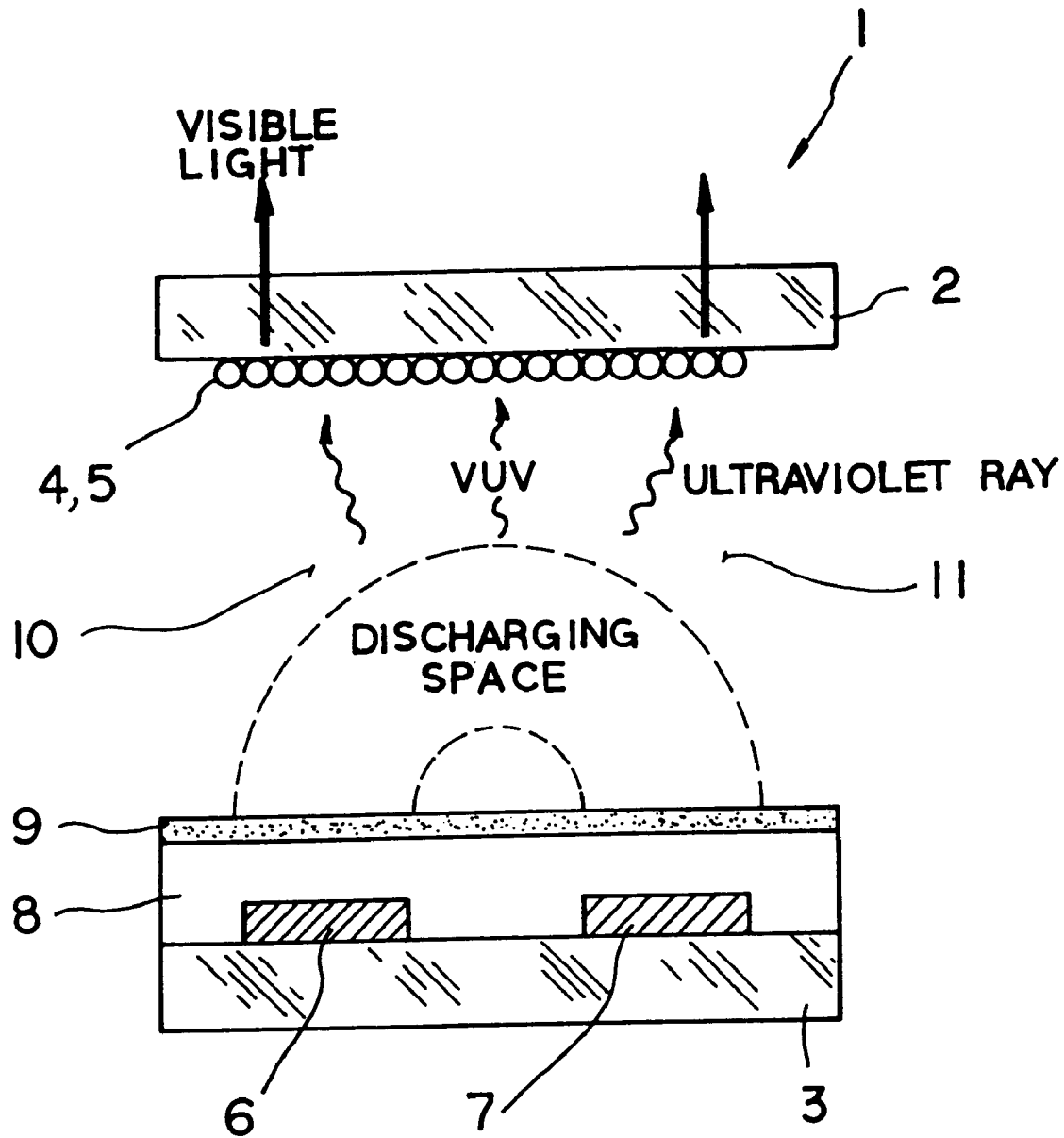
FIG. 2 is a cross-sectional view schematically showing the structure of a plasma display panel (PDP).

A light emitting layer including the phosphor of the Example 1 is formed and a plasma display panel is manufactured as shown in FIG. 2. Light emitting intensity L2 just after this manufacture, and light emitting intensity L3 after the plasma display panel is turned on for 1000 hours, are measured. A ratio (L3/L2) of the light emitting intensity L3 after 1000 hours to the initial value L2 is calculated as a maintaining ratio. The measured and calculated results are shown in Table 1.

As shown in the table 1, the light emitting luminance of the phosphor in the Example 1 shows 110% improved in comparison with the conventional phosphor (in the Comparative Example) including no $Gd_2O_3$. Further, X=+0.020 and Y=−0.020 in the chromaticity are obtained in comparison with the Comparative Example. Accordingly, the light emitting efficiency is clearly greatly increased and the color purity is improved.

The light emitting intensity just after the manufacture of the plasma display panel (PDP) using the phosphor of the Example 1 shows 113% in comparison with the light emitting intensity of the plasma display panel using $(Y_{0.93}Eu_{0.07})_2O_3$ in the Comparative Example as the conventional phosphor. Further, X=+0.025 and Y=−0.025 in the chromaticity are obtained in comparison with the Comparative Example. After the plasma display panel is turned on for 1000 hours, the maintaining ratio of the light emitting intensity shows 0.90 so that this maintaining ratio is also improved in comparison with 0.85 in the Comparative Example. Accordingly, a plasma display panel having both excellent light emitting efficiency and excellent color purity is obtained.

EXAMPLE 2

70 wt % of $Y_2O_3$ powder, 20 wt % of $Gd_2O_3$ powder and 10 wt % of $Eu_2O_3$ powder are measured as a phosphor raw material by a balance and are dissolved into a suitable amount of nitric acid and are formed as a solution at 70° C. A predetermined amount of oxalic acid ($H_2C_2O_4 \cdot 2H_2O$) is injected into this solution and is deposited as an oxalate. The obtained coprecipitation oxalate is thermally decomposed for three hours at 1000° C. so that an oxide is obtained. This oxide is burned for 4 hours at 1400° C. Further, the obtained burned material is ground by a ball mill and is washed and cleaned. Thus, a phosphor represented by a composition formula $(Y_{0.70}Gd_{0.20}Eu_{0.10})_2O_3$ is obtained.

To evaluate characteristics of this phosphor, an ultraviolet ray having 147 nm in wavelength is irradiated to this phosphor so as to excite this phosphor. Light emitting luminance L1 and chromaticity are measured with respect to an obtained light emitting spectrum.

A light emitting layer including the phosphor in the Example 2 is formed and a plasma display panel is manufactured as shown in FIG. 2. Light emitting intensity L2 just after this manufacture, and light emitting intensity L3 after the plasma display panel is turned on for 1000 hours, are measured. A ratio (L3/L2) of the light emitting intensity L3 after 1000 hours to the initial value L2 is calculated as a maintaining ratio. The measured and calculated results are shown in the table 1.

As shown in the table 1, the light emitting luminance of the phosphor in the Example 2 shows 108% improved in comparison with the conventional phosphor (in the Comparative Example) including no $Gd_2O_3$. Further, X=+0.015 and Y=−0.020 in the chromaticity are obtained in comparison with the Comparative Example. Accordingly, the light emitting efficiency is clearly greatly increased and the color purity is improved.

The light emitting intensity just after the manufacture of the plasma display panel (PDP) using the phosphor of the Example 2 shows 110% in comparison with the light emitting intensity of the plasma display panel using $(Y_{0.93}Eu_{0.07})_2O_3$ in the Comparative Example as the conventional phosphor. Further, X=+0.018 and Y=−0.023 in the chromaticity are obtained in comparison with the Comparative Example. After the plasma display panel is turned on for 1000 hours, the maintaining ratio of the light emitting intensity shows 0.88 so that this maintaining ratio is also improved in comparison with 0.85 in the Comparative Example. Accordingly, a plasma display panel having both excellent light emitting efficiency and excellent color purity is obtained.

EXAMPLE 3

20 wt % of $Y_2O_3$ powder, 65 wt % of $Gd_2O_3$ powder and 15 wt % of $Eu_2O_3$ powder are measured as a phosphor raw material by a balance and are dissolved into a suitable amount of nitric acid and are formed as a solution at 70° C. A predetermined amount of oxalic acid ($H_2C_2O_4 \cdot 2H_2O$) is injected into this solution and is deposited as an oxalate. The obtained coprecipitation oxalate is thermally decomposed for three hours at 1000° C. so that an oxide is obtained. This oxide is burned for 4 hours at 1400° C. Further, the obtained burned material is ground by a ball mill and is washed and cleaned. Thus, a phosphor represented by a composition formula $(Y_{0.20}Gd_{0.65}Eu_{0.15})_2O_3$ is obtained.

To evaluate characteristics of this phosphor, an ultraviolet ray having 147 nm in wavelength is irradiated to this phosphor so as to excite this phosphor. Light emitting luminance L1 and chromaticity are measured with respect to an obtained light emitting spectrum.

A light emitting layer including the phosphor of the Example 3 is formed and a plasma display panel is manufactured as shown in FIG. 2. Light emitting intensity L2 just after this manufacture, and light emitting intensity L3 after the plasma display panel is turned on for 1000 hours, are measured. A ratio (L3/L2) of the light emitting intensity L3 after 1000 hours to the initial value L2 is calculated as a maintaining ratio. The measured and calculated results are shown in the table 1.

As shown in the table 1, the light emitting luminance of the phosphor of the Example 3 shows 115% improved in comparison with the conventional phosphor (in the Comparative Example) including no $Gd_2O_3$. Further, X=+0.025 and Y=−0.020 in the chromaticity are obtained in comparison with the Comparative Example. Accordingly, the light emitting efficiency is clearly greatly increased and the color purity is improved.

The light emitting intensity just after the manufacture of the plasma display panel (PDP) using the phosphor of the Example 3 shows 118% in comparison with the light emitting intensity of the plasma display panel using $(Y_{0.93}Eu_{0.07})_2O_3$ in the Comparative Example as the conventional phosphor. Further, X=+0.030 and Y=−0.025 in the chromaticity are obtained in comparison with the Comparative Example. After the plasma display panel is turned on for 1000 hours, the maintaining ratio of the light emitting intensity shows 0.91 so that this maintaining ratio is also improved in comparison with 0.85 in the Comparative Example. Accordingly, a plasma display panel having both excellent light emitting efficiency and excellent color purity is obtained.

EXAMPLE 4

40 wt % of $Y_2O_3$ powder, 58 wt % of $Gd_2O_3$ powder and 2 wt % of $Eu_2O_3$ powder are measured as a phosphor raw material by a balance and are dissolved into a suitable amount of nitric acid and are formed as a solution at 70° C. A predetermined amount of oxalic acid $(H_2C_2O_4 \cdot 2H_2O)$ is injected into this solution and is deposited as an oxalate. The obtained coprecipitation oxalate is thermally decomposed for three hours at 1000° C. so that an oxide is obtained. This oxide is burned for 4 hours at 1400° C. Further, the obtained burned material is ground by a ball mill and is washed and cleaned. Thus, a phosphor represented by a composition formula $(Y_{0.40}Gd_{0.58}Eu_{0.02})_2O^3$ is obtained.

To evaluate characteristics of this phosphor, an ultraviolet ray having 147 nm in wavelength is irradiated to this phosphor so as to excite this phosphor. Light emitting luminance L1 and chromaticity are measured with respect to an obtained light emitting spectrum.

A light emitting layer including the phosphor of the Example 4 is formed and a plasma display panel is manufactured as shown in FIG. 2. Light emitting intensity L2 just after this manufacture, and light emitting intensity L3 after the plasma display panel is turned on for 1000 hours, are measured. A ratio (L3/L2) of the light emitting intensity L3 after 1000 hours to the initial value L2 is calculated as a maintaining ratio. The measured and calculated results are shown in the table 1.

As shown in the table 1, the light emitting luminance of the phosphor in the Example 4 shows 107% improved in comparison with the conventional phosphor (in the Comparative Example) including no $Gd_2O_3$. Further, X=+0.015 and Y=−0.015 in the chromaticity are obtained in comparison with the Comparative Example. Accordingly, the light emitting efficiency is clearly greatly increased and the color purity is improved.

The light emitting intensity just after the manufacture of the plasma display panel (PDP) using the phosphor of the Example 4 shows 110% in comparison with the light emitting intensity of the plasma display panel using $(Y_{0.93}Eu_{0.07})_2O_3$ in the Comparative Example as the conventional phosphor. Further, X=+0.018 and Y=−0.020 in the chromaticity are obtained in comparison with the Comparative Example. After the plasma display panel is turned on for 1000 hours, the maintaining ratio of the light emitting intensity shows 0.90 so that this maintaining ratio is also improved in comparison with 0.85 in the Comparative Example. Accordingly, a plasma display panel having both excellent light emitting efficiency and excellent color purity is obtained.

EXAMPLES 5 to 10

A phosphor in each of Examples 5 to 10 is manufactured in accordance with a processing procedure similar to that in the Example 1 except that a compounding amount of $Gd_2O_3$ used as phosphor raw material powder is changed and adjusted so as to finally obtain compositions shown in the table 1.

Similar to the Example 1, the light emitting luminance and the chromaticity are measured with respect to each phosphor when an ultraviolet ray having 147 nm in wavelength is irradiated to this phosphor. A plasma display panel is also manufactured by using the phosphor in each of the Examples 5 to 10. Further, the light emitting intensity just after this manufacture, the chromaticity and the light emitting intensity after light is emitted for 1000 hours, are calculated as a maintaining ratio. The measured and calculated results are shown in the table 1.

TABLE 1

| | | Phosphor Powder Characteristics | | | PDP Characteristics | | | | |
| | | | | | Light Emitting Intensity (Relative Value) | | | Chromaticity | |
| | | Luminance (Relative Value) | Chromaticity (Relative Value) | | Just after manufactured | After turning-on for 1000 Hours | Maintaining Ratio | (Relative Value) | |
| Sample No. | Phosphor Composition | L1(%) | Δx | Δy | L2(%) | L3(%) | L3/L2 | Δx | Δy |
|---|---|---|---|---|---|---|---|---|---|
| Example 1 | $(Y_{0.53}Gd_{0.40}Eu_{0.07})_2O_3$ | 110 | +0.020 | −0.020 | 113 | 102 | 0.90 | +0.025 | −0.025 |
| Example 2 | $(Y_{0.70}Gd_{0.20}Eu_{0.10})_2O_3$ | 108 | +0.015 | −0.020 | 110 | 97 | 0.88 | +0.018 | −0.023 |
| Example 3 | $(Y_{0.20}Gd_{0.65}Eu_{0.15})_2O_3$ | 115 | +0.025 | −0.020 | 118 | 107 | 0.91 | +0.030 | −0.025 |
| Example 4 | $(Y_{0.40}Gd_{0.58}Eu_{0.02})_2O_3$ | 107 | +0.015 | −0.015 | 110 | 99 | 0.90 | +0.018 | −0.020 |
| Example 5 | $(Y_{0.80}Gd_{0.12}Eu_{0.08})_2O_3$ | 112 | +0.017 | −0.016 | 115 | 107 | 0.93 | +0.021 | −0.018 |
| Example 6 | $(Y_{0.50}Gd_{0.30}Eu_{0.20})_2O_3$ | 111 | +0.021 | −0.019 | 116 | 103 | 0.89 | +0.024 | −0.021 |
| Example 7 | $(Y_{0.10}Gd_{0.80}Eu_{0.10})_2O_3$ | 105 | +0.015 | −0.021 | 108 | 97 | 0.90 | +0.016 | −0.022 |
| Example 8 | $(Y_{0.90}Gd_{0.06}Eu_{0.04})_2O_3$ | 110 | +0.022 | −0.018 | 114 | 105 | 0.92 | +0.025 | −0.020 |
| Example 9 | $(Y_{0.47}Gd_{0.40}Eu_{0.13})_2O_3$ | 120 | +0.020 | −0.023 | 122 | 109 | 0.89 | +0.020 | −0.020 |

TABLE 1-continued

| | | Phosphor Powder Characteristics | | | PDP Characteristics | | | | |
| --- | --- | --- | --- | --- | --- | --- | --- | --- | --- |
| | | | | | Light Emitting Intensity (Relative Value) | | | Chromaticity (Relative Value) | |
| | | Luminance (Relative Value) | Chromaticity (Relative Value) | | Just after manufactured | After turning-on for 1000 Hours | Maintaining Ratio | | |
| Sample No. | Phosphor Composition | L1(%) | Δx | Δy | L2(%) | L3(%) | L3/L2 | Δx | Δy |
| Example 10 | $(Y_{0.50}Gd_{0.32}Eu_{0.18})_2O_3$ | 116 | +0.023 | −0.019 | 118 | 107 | 0.91 | +0.023 | −0.022 |
| Comparative Example | $(Y_{0.93}Eu_{0.07})_2O_3$ | 100 | 0 | 0 | 100 | 85 | 0.85 | 0 | 0 |

As can be seen from the results shown in this table 1, it can be confirmed that the light emitting luminance and the color purity are greatly improved in the phosphor obtained by solid-dissolving a predetermined amount of gadolinium (Gd) into a $Y_2O_3$:Eu-including phosphor in each of the Examples in comparison with the phosphor in the Comparative Example in which the above element is not included.

Further, when a plasma display panel is manufactured by using the phosphor in each of the Examples, the light emitting intensity and the color purity are also greatly increased just after this manufacture, and after light is emitted for a predetermined time. Accordingly, it is clear to obtain a plasma display panel having excellent light emitting efficiency and excellent color purity with reduced deterioration.

As explained above, in accordance with the phosphor and the plasma display panel (PDP) of the present invention, a gadolinium (Gd) component is solid-dissolved into the $Y_2O_3$:Eu-including phosphor. Therefore, the light emitting intensity (luminance) and the color purity can be greatly increased in a red light region under the excitation of an ultraviolet ray having 147 nm in wavelength. Accordingly, when the plasma display panel is formed by including this phosphor within a fluorescent film (a light emitting layer), the light emitting intensity and the color purity of the plasma display panel can be greatly improved.

What is claimed is:

1. A plasma display panel comprising a light emitting layer including a phosphor represented by a general formula $(Y_{1-a-b}Gd_aEu_b)_2O_3$, wherein $0.4 \leq a \leq 0.6$, and $0.01 \leq b \leq 0.20$.

2. The plasma display panel according to claim 1, further comprising an ultraviolet light generator configured to excite said phosphor.

3. The plasma display panel according to claim 2, wherein said ultraviolet light generator comprises a discharge space having a height of about 0.1 mm.

4. The plasma display panel according to claim 2, wherein said ultraviolet light generator comprises a mixing gas comprising xenon.

5. The plasma display panel according to claim 2, wherein said ultraviolet light generator is configured to generate ultraviolet light having a wavelength of 147 nm.

* * * * *